April 13, 1965     E. COHEN ETAL     3,178,598
ALTERNATING-CURRENT MACHINES
Filed Nov. 22, 1961                 3 Sheets-Sheet 2

INVENTORS:
ELIE COHEN
SZYMON ROTH
BY
Karl F. Ross
AGENT

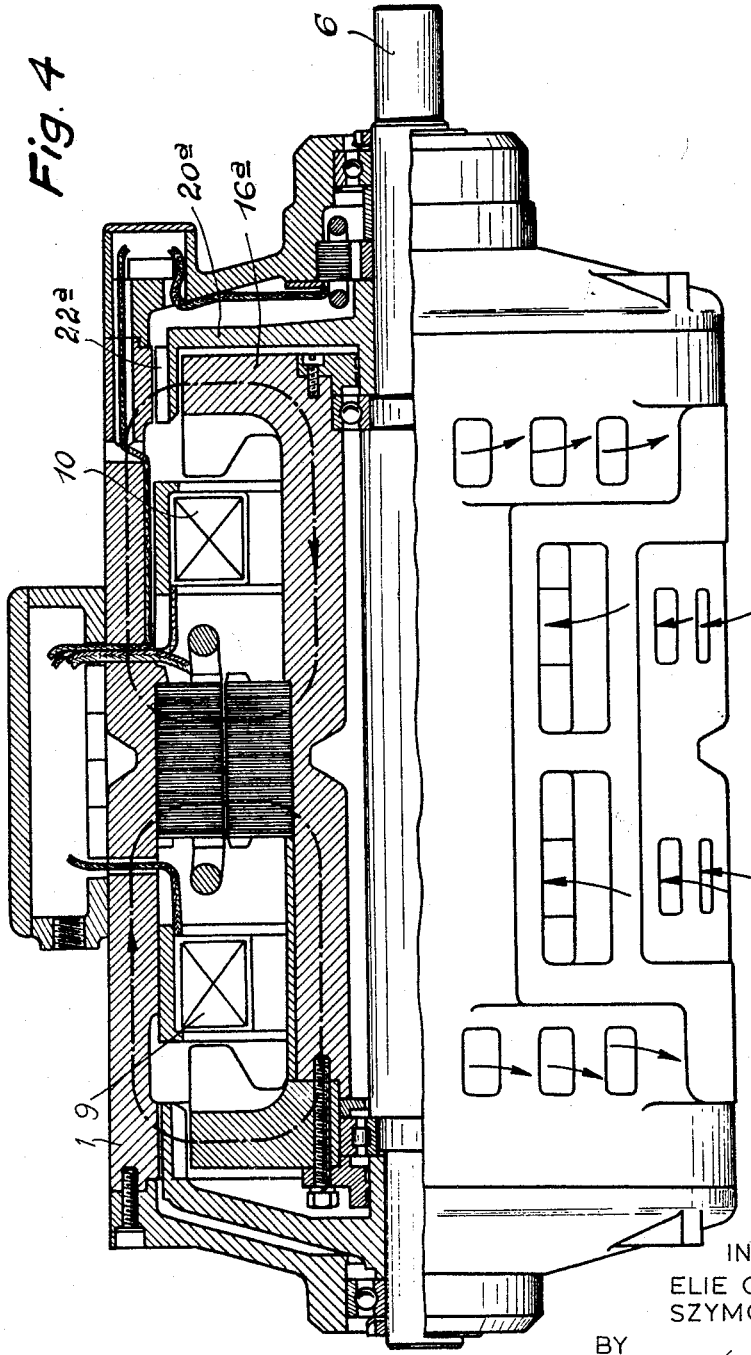

United States Patent Office 3,178,598
Patented Apr. 13, 1965

3,178,598
ALTERNATING-CURRENT MACHINES
Elie Cohen, 89 Rue Bobillot, Paris 13, France, and Szymon Roth, 18 Blvd. Barbes, Paris 18, France
Filed Nov. 22, 1961, Ser. No. 154,176
Claims priority, application France, Jan. 30, 1961, 851,118
11 Claims. (Cl. 310—98)

The present invention relates to an alternating-current machine for providing variable-speed drive and has for its object the provision of such a machine which with slight modifications, can be used as an electromagnetic speed-changing transmission, a decelerating device employing dynamic braking, or an electromagnetic speed changer incorporating an eddy-current brake. These operations in accordance with our invention, are obtainable without the use of rings, brushes or collectors by a combination of an asynchronous motor and eddy-current couplers, the latter including rotor assemblies for the transmission of torque from the motor armature to an output shaft or, in some instances, for the exertion of a braking force upon said shaft.

According to a more specific feature of the invention we provide an alternating-current machine comprising an induction-type or asynchronous motor having a stator carrying polyphase windings, a rotor sleeve carrying an armature, an output shaft rotatable in bearings supported by the stator housing, coaxial bearings interposed between the rotor sleeve and the shaft, so that the sleeve is freely rotatable on the said shaft, an eddy-current coupling including rotor members arranged to rotate with the sleeve and co-operating members arranged to rotate with the shaft, the latter members having portions (e.g. flanges) interposed in a flux path between the rotor members and the stator housing of the motor, and an excitation device for the coupling arranged within the stator of the motor, this excitation device being so situated that the lines of flux generated thereby follows at least partly the path of the lines of flux of the asynchronous motor.

It will be appreciated that since the rotor of the asynchronous motor is connected to the output shaft not directly but only by means of the eddy-current coupling, it is thus possible, in dependence on the excitation of the coupling, to transmit the motor torque to the shaft with a certain slip, that is to say, to make the output-shaft speed vary progressively from zero (with the motor armature rotating) to a speed in the vicinity of the synchronous speed of the motor (substantially no slip between the armature-carrying sleeve and the output shaft).

The invention will be readily understood in its various modified forms with reference to the accompanying drawing, given by way of example, wherein.

Figure 1:
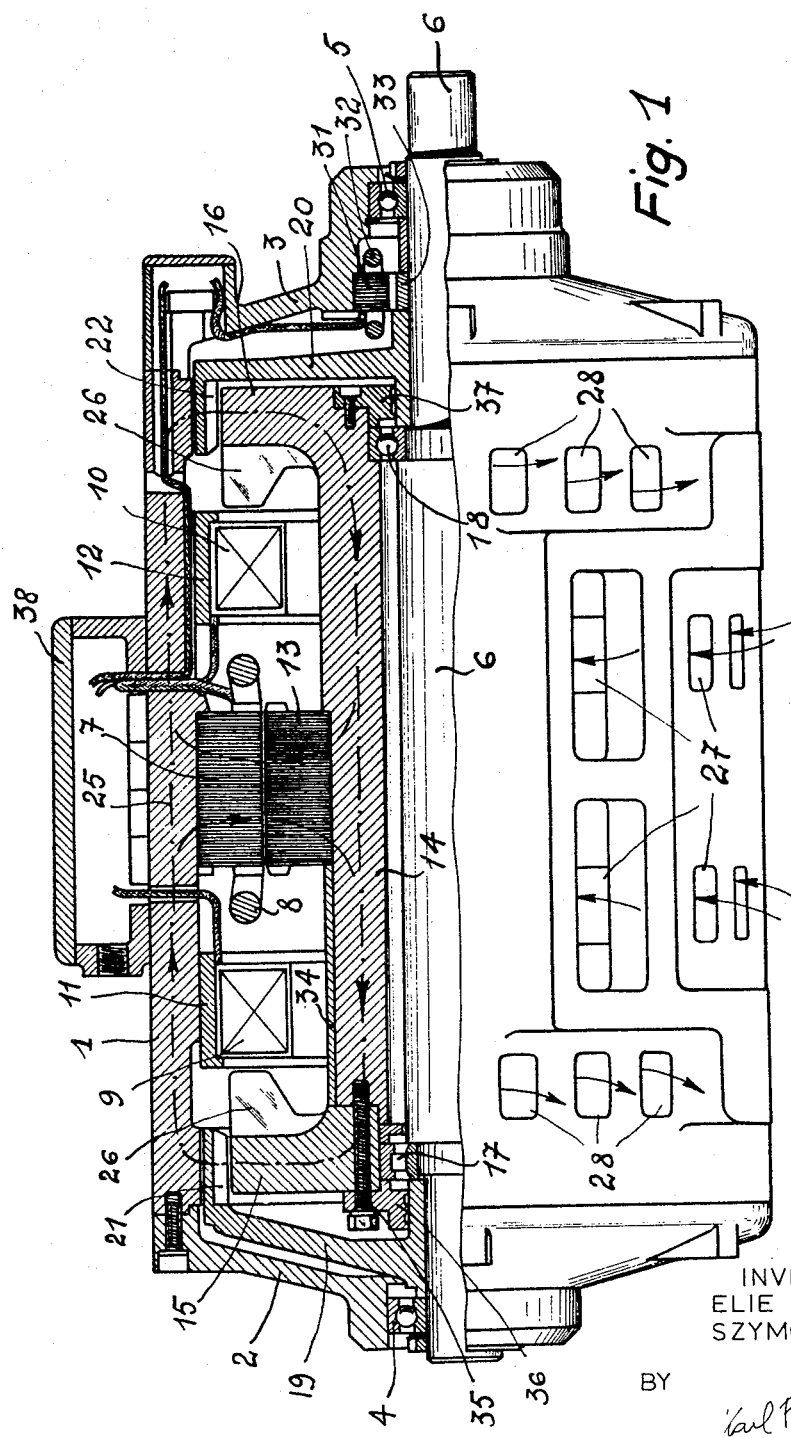
FIG. 1 is a view in elevation and in half-section of a machine according to the invention.
Figure 3:
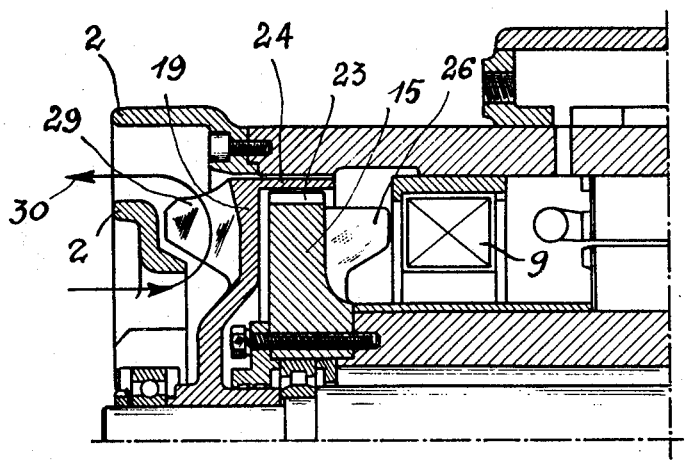

FIG. 3 is a partial sectional view showing a modified form of this machine and ventilating arrangements which are particularly suitable for this modified form; and FIG. 4 is a view in elevation and in half-section of a further modified form, wherein the left half is similar to that of FIG. 1 whereas the right half differs, being designed in such a manner that this right-hand part of the coupling is operable as an eddy-current brake.

In FIG. 1 there is shown one embodiment of a machine according to our invention comprising an asynchronous motor and an eddy-current coupling, the motor including a housing 1 made of steel having high magnetic permeability. This frame is closed laterally by two end plates 2 and 3, whose central portions support radial bearings 4 and 5 wherein rotates an output shaft 6. The stator 7 of the asynchronous motor 7, 13 is made of silicon-steel plates in the notches of which are mounted polyphase windings 8. The excitation windings 9, 10 of two couplers 15, 19 and 16, 20 are situated symmetrically relatively to the stator. These windings are fixed by means of casings 11 and 12. The squirrel-cage rotor armature 13 of the asynchronous motor confronts the surrounding stator 7 and is fixed on a magnetically permeable rotor sleeve 14 which carries at its respective ends the inner rotor members 15 and 16 of the eddy-current couplers. The rotor sleeve 14 is supported by bearings 17 and 18 centered on bearing surfaces formed on the shaft 6. In this way, the sleeve 14 is freely rotatable on the shaft 6. The outer rotor members 19 and 20 of the couplers are flywheels keyed to the shaft 6 and rotate consequently at the same speed as this shaft. In FIG. 1, the outer cylindrical surface of the rotor members 19 and 20 is smooth, as also the outer cylindrical surface of the rotor members 15 and 16, but the inner peripheries of the cylindrical flange portions of the rotor members 19 and 20 are corrugated by being formed with alternate teeth and notches as shown at 21 and 22, which will cause eddy-currents to be set up in the mass of the rotor members 15 and 16. Shaft 6, sleeve 14 and housing 1 are all coaxially disposed.

In the modification shown in FIG. 3, on the other hand, the teeth and notches 23 are arranged on the outer periphery of the inner rotor members 15 and 16, whilst the eddy currents are produced in the smooth cylindrical portion 24 of the outer rotor members 19 and 20.

In the case of the embodiment of FIGS. 1 and 3, the windings 9 and 10 are supplied with direct current. The windings are connected in such a manner that the continuous magnetic flux represented by the looped path 25 extends longitudinally through the stator housing 1 and then radially through the peripheral flange portions of the outer rotor members 19, 20 of the couplers, the rotor mass of the inner members 15, 16, and the sleeve 14 in the longitudinal direction. It will be apparent that branch lines pass through the stator and rotor elements 7, 13 but that, being directed in opposite senses, they cancel one another out.

The way in which the machine according to the invention operates will be apparent from the description which has just been given.

As soon as the stator windings 8 are connected to the polyphase sector, the squirrel-cage rotor armature 13 commences to rotate, driving motor system 14, 15, 16 of the eddy-current couplers. The shaft 6 remains motionless if the windings 9 and 10 are not supplied with current.

In order to start the change-speed gear, a direct current is passed through the excitation windings 9 and 10 of the coupling. A driving torque then appears by virtue of the electro-magnetic field due to the eddy currents produced in the conductive masses of the smooth-surface members 15 and 16 of the two couplers. The rotational speed of the shaft 6 depends on the intensity of the excitation current in the windings. It will be apparent that the available power at the output of the speed changer is furnished by the source which supplies the stator 7 of the asynchronous motor. The torque supplied by the speed changer being always equal to the torque supplied by the rotor 13 of the asynchronous motor, a change in speed due to slip is always accompanied by a loss of power, which is converted into heat and has to be dissipated.

Figure 2:
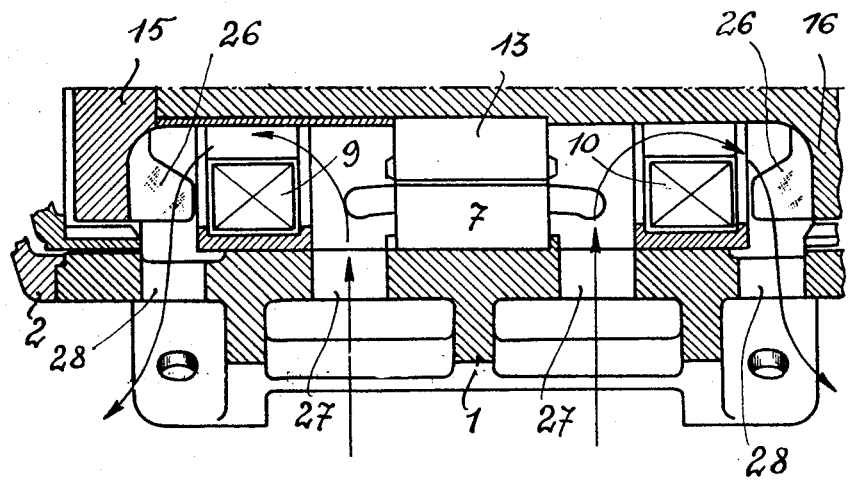
FIG. 2 is a partial sectional view showing the ventilating arrangements of the machine.

The cooling system used in the speed changer according to the embodiment of FIG. 1 comprises vanes 26 fixed to the inner smooth-surface rotor members 15 and 16. Since these members rotate at the speed of the motor armature 13, thus always very fast, the hot surfaces are cooled in a particularly effective manner. At the same time, the vanes 26 considerably increase the cooling surface. As indicated by arrows in FIGS. 1 and 2, the cold air enters through apertures 27 in the motor housing 1, passes through the space remaining between the stator 7 of the motor and the excitation windings 9 and 10 of the couplers, flows over these windings and is ejected by vanes 26 through the apertures 28 of the housing.

By this method of cooling, the stator windings of the motor, the excitation windings 9, 10 of the eddy current couplers and the hot parts of these couplers are also effectively cooled.

In the modified embodiment of the invention shown in FIG. 3, the method of cooling the windings 9 and 10 is the same as that shown in FIG. 1, but the outer rotor members such as the one shown at 19, 24 are provided with cooling vanes 29. In this case, the atmospheric air aspirated by these vanes is expelled along a path of travel indicated by the arrow 30. The lateral bearing plates 2 and 3 are of stepped shape to accommodate the rotation of the vanes.

The speed changer according to the invention is provided with a tacho-generator or speed indicator 31, 32 and 33 shown in the right-hand portion of FIG. 1. Its rotor 33 is a permanent-magnet inductor fixed to the shaft 6. Its stator 31 comprises a winding 32 developing an electric voltage proportional to the rotational speed of the shaft. This voltage, variable in amplitude and frequency, can be used to effect speed regulation in pilot-operated systems. The tachometer is particularly simple having neither rings, collectors, brushes, bearings, nor circuit elements.

The machine just described permits of decelerating the speed changer by dynamic braking, which can be obtained in a very advantageous manner. To this end, it is sufficient to cut off the supply to the stator winding 8 and to reverse the direction of the energizing current in only one of the excitation windings 9 or 10. The lines of magnetic force caused by the ampere-turns of the two excitation windings then pass through the stator of the motor in one and the same direction instead of canceling each other out as in the normal case shown in FIG. 1. The currents induced under the effect of this magnetic field in the rotor 13 cause braking of the rotor assembly 13, 14, 15, 16 and outer rotor members 19 and 20 will be slowed down at the same time as the shaft 6 with which they rotate.

The modification shown in FIG. 4 comprises an electro-magnetic speed changer with an incorporated eddy-current brake. In this figure, the right-hand portion of the coupling has been modified and the corresponding front coupler 20 (FIG. 1) has been replaced by an eddy-current brake.

This brake is constituted by the inner rotor member 16a, the corrugated outer rotor member 20a provided with teeth and notches 22a in its outer cylindrical portion, the stator housing 1 and the excitation winding 10.

In order to obtain a braking effect, all that has to be done is to reduce the excitation current in the winding 9 of the coupler and to energize the winding 10 of the eddy-current brake.

In this case, the eddy currents are produced in the inner cylindrical surface of the housing 1 which is situated opposite the teeth and notches 22a of the rotor 20a.

It will be seen that in assembling the machine, the rotor armature 13 is slidable axially into position on the sleeve 14 and is locked in this position by a sleeve 34 (FIG. 1) which in turn is locked by means of the inner rotor 15 held on the end of the sleeve 14 by screws 35.

The presence of annular packings 36 and 37 will also be noted, arranged at the ends of the rotor assembly on either side of the bearings 17 and 18, these packings resting on cylindrical bearing surfaces of the outer rotor members 19 and 20.

The particular arrangement of the cables of the different windings of the motor, of the excitation windings of the couplers and of the tacho-generator are evident from the drawing, these cables passing through suitable apertures in the stator housing to terminate in a connection box 38.

It will be apparent that, without departing from the scope of the invention as defined by the claims appended hereto, it is possible to make modifications to the embodiments which have just been described. Thus, although the machine has been described and illustrated as comprising one motor and two couplers, it will be apparent that it would also be possible to use a single coupler or more than two, distributed in a suitable manner over the motor housing, or even to provide a plurality of asynchronous motors combined with a plurality of eddy-current brakes or couplers.

What we claim is:

1. An alternating-current machine for providing variable-speed drive, comprising a motor having a generally cylindrical housing of magnetically permeable material, a stator internally secured to said housing, polyphase windings on said stator, a magnetically permeable rotor sleeve and an armature carried by said sleeve in confronting relationship with said stator; an output shaft coaxially rotatable within said housing, said rotor sleeve coaxially surrounding said shaft within said housing and being freely rotatable around said shaft; and an eddy-current coupling in said housing including two rotor members fixed to said sleeve in substantially symmetrical position on opposite sides of said armature, two co-operating coupling members juxtaposed with said rotor members and fixed to said shaft, said coupling members having portions interposed in a flux path between said rotor members and said stator, and excitation means for said coupling disposed within said stator for producing lines of flux along two looped paths respectively including said rotor members, said portions and different parts of said stator and said sleeve, said paths further including said stator and said armature.

2. A machine according to claim 1 wherein said housing is provided with axially spaced bearings supporting opposite ends of said shaft, said co-operating members being two flywheels disposed substantially symmetrically on opposite sides of said armature between said rotor members and said bearings, said flywheels each having a cylindrical flange constituting said interposed portion thereof and extending between the outer periphery of an adjacent one of said one of said rotor members and the inner periphery of said housing.

3. A machine according to claim 2 wherein the periphery of each of the said rotor members is a smooth cylinder surface, the adjacent periphery of said flange of each of said flywheels being corrugated.

4. A machine according to claim 2 whrein said excitation means comprises two direct-current windings arranged substantially symmetrically on opposite sides of said stator.

5. A machine according to claim 4 wherein said windings are disposed substantially midway between said rotor members and said armature and stator.

6. A machine according to claim 4 wherein said housing is provided with ventilation apertures next to said stator on opposite sides thereof and at locations between said rotor members and said direct-current windings, further comprising vanes on said rotor members for circulating cooling air through said apertures.

7. A machine according to claim 4 wherein said excitation means includes circuit means for selectively energizing said windings in aiding and opposed relationship of their fluxes through said stator and said armature.

8. A machine according to claim 2 wherein the periphery of each of said rotor members is corrugated, said flange of each of said flywheels being smooth on its inner and outer peripheral faces.

9. A machine according to claim 8 wherein said flywheels are provided with lateral cooling vanes, said housing including a pair of end plates provided with bearings for said shaft, said end plates having apertures for the circulation of cooling air by said vanes.

10. A machine according to claim 2 wherein the inner peripheral surface of said flange of one of said flywheels and the outer peripheral surface of said flange of the other flywheel are corrugated whereby said coupling is capable of acting partly as a torque transmitter and partly as a brake, said corrugated outer peripheral surface confronting said housing for inducing eddy currents therein.

11. A machine according to claim 2, further comprising speed-indicator means including a permanent-magnet inductor fixed to said shaft and a co-operating armature supported on said housing.

References Cited by the Examiner

UNITED STATES PATENTS 2,630,466  3/53  Landis _____ 310—105
3,054,006  9/62  Bancroft _____ 310—92

MILTON O. HIRSHFIELD, *Primary Examiner.*